United States Patent Office 3,081,352
Patented Mar. 12, 1963

3,081,352
MERCAPTO DERIVATIVES OF
CYCLODODECENES
Irwin J. Gardner and Samuel B. Robison, Roselle, and
Anthony H. Gleason, Scotch Plains, N.J., assignors to
Esso Research and Engineering Company, a corporation of Delaware
No Drawing. Filed July 16, 1959, Ser. No. 827,428
9 Claims. (Cl. 260—609)

The present invention relates to new compositions of matter and to processes for producing these new compositions of matter. More particularly this invention relates to new vulcanization agents and to processes for producing them whereby superior agents are obtained at a fraction of the cost of the preferred prior art materials available. Yet more particularly, this invention relates to the new compositions of matter mercapto cyclododecadiene and dimercapto cyclododecene. Most particularly, this invention relates also to vulcanized rubbery compositions containing polymers having low concentrations of halogens and the present dimercaptan vulcanization agent. The new composition of matter materials of this invention are represented as follows:

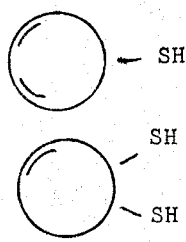

It has now been discovered that an extremely effective vulcanization agent for chlorinated butyl rubbers can be prepared cheaply from the butadiene trimer, cyclododecatriene. Thus, starting with this readily available material, cyclododecatriene, a difunctional dimercapto cyclododecene can be prepared having present in the ring an unsaturated linkage which thus makes the finished vulcanized rubber less susceptible to ozone attack. This is because the introduction of additional non-chain contained unsaturation essentially dilutes the number of chain double bonds when compared to the total unsaturation. Therefore, the probability of reaction of a chain double bond with ozone, present in concentrations lower than the total unsaturation, resulting in rupture of a polymer chain is reduced in direct relation to the number of non-chain double bonds introduced during vulcanization. Due to the structure of the present dimercaptan, cleavage of the ring double bond in the cross-link does not destroy the cross-link.

The present new composition of matter material is cheaply prepared by the addition of thiolacetic acid to cyclododecatriene followed by saponification of the esters formed to mono and dimercaptans. These mono and dimercaptans are not only excellent vulcanization agents but they may also be used as chemical intermediates and as cross-linking agents for a wide variety of polyolefinic materials or may be polymerized by self-addition.

The 1,5,9-cyclododecatriene (nicknamed CDT) starting material of this invention is prepared by trimerizing butadiene with alkyl metal type catalysts. The preparation of cyclododecatriene is described for example in Angewandte Chemie, vol. 69, No. 11, 397 (June 7, 1957). Although four stereo isomers of 1,5,9-cyclododecatriene are theoretically possible only two have thus far been isolated. These are the cis, trans, trans (cis., tr., tr.) and the trans, trans, trans (tr., tr., tr.) as shown by the formulas below.

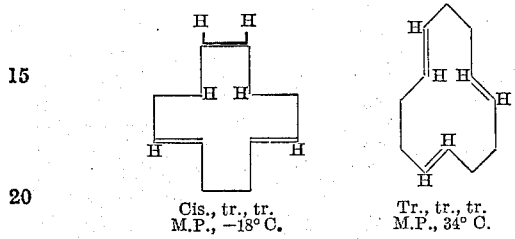

Cis., tr., tr.
M.P., –18° C.

Tr., tr., tr.
M.P., 34° C.

Throughout this specification it will be assumed that either of the isomers above represented or of the other isomers may be utilized or mixtures thereof.

The mercapto derivatives of cyclododecatriene are prepared by the addition of thiolacetic acid to cyclododecatriene in the presence of peroxide catalysts and/or ultra violet light. Mol ratios of thiolacetic acid to cyclododecatriene may be in the range of 1 to 10. To prepare preferentially the monomercaptan, mercapto cyclododecadiene, stoichiometric amounts of the thiolacetic acid are used in the range of 1 to 2 mols of thiolacetic acid per mole of CDT. To prepare preferentially the dimercapto derivative, dimercapto cyclododecene, it is preferred to utilize thiolacetic acid in excess in the range of 2 to 4 mols of thiolacetic acid per mole of CDT. Alternatively, or in addition, the monomercapto derivative may be separated by distillation and the monomercapto compound recycled to the process to obtain larger amounts of dimercapto cyclododecene. Reaction conditions are temperatures of 20–100° C., preferably 40 to 75° C., and atmospheric pressure. The reaction is exothermic but in general no cooling is required. Suitable peroxide catalysts for this reaction are organic peroxides such as benzoyl peroxide, cumene hydroperoxide and t-butyl hydroperoxide. Following preparation of the mono and diesters they may be separated by distillation if desired, and the esters saponified with an aqueous base solution. This hydrolysis is conducted at temperatures of 100 to 150° C. and utilizing 1.1 to 2.0 mols of base per mole of the ester. Again atmospheric pressure is preferably used in this liquid phase reaction. The concentration of the base is preferably in the range of 3 to 10 wt. percent of the alkali metal hydroxide and preferably sodium hydroxide is used. Following hydrolysis the two phase reaction mixture is acidified with an acid such as HCl to liberate the mercaptans and neutralize the excess base present. In this two phase system the sodium salt thus formed goes into the water phase with the acetic acid, and the mercaptans are separated in the organic phase. Following hydrolysis if prior separation of the monoesters from the diester has not been effected by distillation, distillation is conducted to separate mercapto cyclododecadiene boiling at 100–110° C./2.2 mm. from dimercapto cyclododecene boiling at 130–140° C./1.0 mm.

The dimercapto cyclododecene has now been found to be very effective as a vulcanization agent for halogenated butyls. This cyclic dimercaptan possesses a stable ring double bond which not only survives the cross linking process but also is of a type wherein ozone attack upon the double bond does not break the cross link. Additionally, the odor of this dimercaptan is not offensive and is almost absent. Experimental results show that curing halogenated butyl rubber with dimercapto cyclododecene in combination with zinc oxide produces vulcanized rubbers having excellent chemical and physical properties. Thus, for example, the dimercapto cyclododecene agent is faster curing than tetramethyl thiuram disulfide and is generally superior to said compound.

The preferred halogenated low unsaturation compound to be used with the present vulcanization agents is halogenated butyl rubber. Butyl rubber is a polymer which contains about 85 to 99.5 wt. percent of a $C_4$ to $C_7$ isoolefin, such as isobutylene, and about 15 to 0.5 wt. percent of a multiolefin containing 4 to 14 carbon atoms, and preferably about 4 to 6 carbon atoms. While the preferred multiolefin is isoprene, other conjugated diolefins such as butadiene-1,3, dimethyl-butadiene and piperylene may be employed. Butyl rubber or GR–I rubber (Government rubber-isobutylene) generally has a mole percent unsaturation between 0.5 and 15 and a viscosity average molecular weight of from about 200,000 to 1,500,000 or more. Its preparation is described in U.S. Patent 2,356,128 issued to R. M. Thomas et al. and elsewhere in the literature.

The halogenated butyl rubber most suitable for the purposes of the present invention is butyl rubber which has been carefully halogenated so as to contain at least 0.5 wt. percent (preferably about 1 wt. percent) of combined halogen but not more than about "X" wt. percent combined chlorine or 3 "X" wt. percent of combined bromine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 weight percent of combined halogen in the polymer but not more than about one atom of chlorine or 3 atoms of bromine combined in the polymer per molecule of multiolefin present therein; i.e., not more than about one atom of combined chlorine or three atoms of combined bromine per double bond in the polymer.

Suitable halogenating agents which may be employed are gaseous chlorine, liquid bromine, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, iodine monochloride, alphachloroacetoacetanilide, tri-bromophenol bromide, N-chloroacetamide, beta-bromo-methyl phthalimide, N,N'-dimethyl-5,5 dichloro or dibromo hydantoin, and other common halogenating agents.

The halogenation is generally conducted at above 0° to about +100° C., advantageously at about 0° to 65° C., preferably at about 20° to 50° C. (room temperature being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubber copolymer to the extent above-mentioned.

The halogenation may be accomplished in various ways. For instance, the solid copolymer may be halogenated per se. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000 if the solvent is a substantially inert hydrocarbon, will be between 1 and 30% by weight, preferably about 5 ot 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone or any other known non-solvent for the butyl rubber and dried under about 1 to 760 millimeters or higher of mercury pressure absolute at about 0° to 180° C., preferably at about 50° to 150° C. (e.g. 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 1,500,000 and a mole percent unsaturation of between about 0.5 to 15.0, preferably about 0.6 to 5.0.

The quantity of polythiol organic compound, or mixtures thereof, blended with the halogenated butyl rubber and other ingredients will, of course, depend on the properties desired in the vulcanizate. Thus, the amount of polythiol organic compound employed may range from as little as 0.1 part by weight per 100 parts by weight of rubber (phr.) to as much as 15 phr. or more. However, in most instances it is necessary to use at least about 0.5 phr. of the polythiol organic compound in order to obtain a vulcanizate having good properties. Moreover, for polythiol compounds having molecular weights below 300, such as the present dimercapto cyclodecene, it is generally desirable to use not more than 5 or 10 phr. of polythiol. Since it is believed that the polythiols react with the halogen contained in the low unsaturation polymers and since the halogen content of the polymer may vary, it is usually best to use from about 0.25 to 0.75 mole of polythiol compound for each mole atom of halogen in the polymer.

While the polythiol compounds of the present invention are suitable curing agents in themselves, it is sometimes desirable to include in the rubber recipe a minor amount, say 0.5 to 10 phr., of a bivalent metal oxide, e.g. tin oxide, lead oxide and especially zinc oxide. It has been noted that metal oxides, the metal portion of which is a low melting metal selected from groups IIB and IVA of the periodic chart (Lange's Handbook of Chemistry, 8th edition), not only co-cure the halogenated low unsaturation rubber but also appear to accelerate and enhance the curing action of the polythiols themselves. It is believed that the polythiol may react with the metal oxide to produce a polymercaptide which will rapidly react with labile halogen atoms to effect cross-links at a rate considerably higher than the polythiol itself. Therefore, where high tensile strength rubber compounds are needed, it is advisable to employ from about 1 to 5 phr. of metal oxide.

Prior to vulcanizing the halogenated low unsaturation rubber with the polythiol organic compounds of the present invention, in the presence or absence of zinc oxide, conventional amounts of fillers such as carbon black, clay, etc. may be compounded with the rubber. For instance, the rubber recipe may include from 30 to 70 phr. of carbon black or finely divided siliceous material, 0.1 to 10 phr. of an accelerator, such as benzothiazyl disulfide, tetramethyl thiuram disulfide or 2-mercaptoimidazoline, about 0.1 to 5 phr. of stearic acid, conventional amounts of hydrocarbon extender oils and plasticizers as well as minor amounts of tackifiers.

The rubber stocks compounded according to the present invention may include, in addition to those things mentioned above, other polymers such as butadiene-styrene polymer, natural rubber, polyisobutylene, polyisoprene, polychloroprene, butyl rubber and reclaimed butyl rubber. It is only necessary to have a sufficient quantity of halogenated low unsaturation rubber in the recipe to produce a vulcanizate having the physical properties required for the particular article which will contain the vulcanized rubber. Moreover, it may be desirable in certain instances to have other curing agents present, such as sulfur, sulfur compounds, and dimethylol-para- or meta-alkyl-substituted phenol resins. These ingredients may be used in conventional quantities.

The halogenated, low unsaturation rubbers compounded according to the present invention may be used in many articles that are made wholly or partially with rubber. For example, they may be employed in tires, curing bladders and bags, hoses, wire insulations, conveyor belts, etc. They may be emulsified in an aqueous system or dissolved in an organic solvent, such as hexane, and used to treat fabrics, especially cotton, nylon or rayon tire cords. The latices and cements prepared with rubber compounded in accordance with the present invention may be used to adhere various fabrics or metals, as well as various rubber stocks, including stocks containing natural rubber and butadiene-styrene rubber. In the case of latices, when bonding fabric to rubber, it is generally advisable to have a minor amount of a phenolic-aldehyde resin, such as resorcinol formaldehyde resin, in the dip. Sometimes, it is desirable to include in the dip a small quantity of the polythiol organic compounds of the present invention. The polythiols may be used in combination with the resin or in lieu thereof.

The rubber stocks compounded according to the present invention may be vulcanized according to processes well known in the art. For instance, the compounded rubber may be press cured or steam cured at elevated temperatures, say from 250 to 400° F., for from a few minutes up to several hours. It is preferable in most instances to carry out the vulcanization at a temperature between 250 and 350° F. for from 5 to 90 minutes. The vulcanization time is usually shorter when higher temperatures are employed and longer when lower temperatures are used. Relatively speaking, the cure is generally quite rapid and the physical, chemical, dynamic, etc. properties of the vulcanizate are superior to those obtained with zinc oxide alone or combinations of zinc oxide and accelerators, such as tetramethyl thiuram disulfide. Some of the polythiol organic compounds, especially the higher alkyl and aromatic derivatives when compounded according to the present invention, produce rubber stocks which have a Mooney scorch time as high as 30 minutes or more (small rotor 5 point rise) at 260° F.

The following examples present laboratory preparations of the new compositions of material of this invention and also present data showing the excellent properties of the dimercapto cyclododecene when compounded and used in chlorinated butyl rubber as compared to other vulcanization agents so used.

EXAMPLE I

Two hundred grams of freshly distilled thiolacetic acid (2.6 mols) were slowly added to 425 g. of cyclododecatriene (2.6 mols) containing 300 p.p.m. of preformed active oxygen obtained by the addition of one gram of benzoyl peroxide. The temperature rose to about 65° C. during the addition of the first hundred grams of acid and then fell slowly. The final mixture was exposed to UV light from a Hanovia sun lamp in a quartz flask for 16 hours. Fractional distillation of the crude product showed that practically all of the thiolacid had reacted. The mono-ester distilled at 110–115° C./0.4 mm. (300 g.) and analyzed 13.5% sulfur (theory 13.4%); the residue (70 g.) contained 20.1% sulfur and was mainly the diester (theoretical sulfur 20.3%). In a repetition of this run, using the monoester as feed and mole for mole of thiolacetic acid, a 50% conversion to diester with traces of triester was obtained.

Hydrolysis of the mono and dithiol acetates with an excess of 10% aqueous sodium hydroxide at 100° C. followed by acidification to liberate the mercaptan gave mercapto cyclododecadiene and dimercapto cyclododecene boiling at 100–110° C./2.2 mm. (15.8% sulfur) and 130–140° C./1.0 mm. respectively.

EXAMPLE II

The chlorinated butyl rubbers were prepared by chlorinating a copolymer containing about 97 wt. percent isobutylene and 3 wt. percent isoprene which had a viscosity average molecular weight of 425,000. Of the chlorinated copolymers obtained one contained 1.12 wt. percent chlorine and had a viscosity average molecular weight of 416,000 with an iodine number of 5.9 and the other contained 1.4 wt. percent chlorine and had a viscosity average molecular weight of 410,000 with an iodine number of 5.2. These chlorinated butyl rubbers were compounded with zinc oxide, alone and with the addition of the following vulcanization agents in different amounts, dimercapto cyclododecene, tetramethylthiuram disulfide (TMTDS), and ethanedithiol.

Since TMTDS is presumed capable of forming two cross-links between polymer molecules per molecule of TMTDS and the dithiols are believed capable of producing only one such cross-link, usually two moles of the dithiol were used for each mole of thiuram disulfide in recipes compared in the following table. Each of the non-rubber ingredients was added to the chlorinated butyl on a rubber mill at 80–90° F. in the conventional manner. A sample of each chlorinated butyl rubber so compounded was cured for 15, 30 or 45 minutes at 307° F.

The physical properties of the vulcanizates and their compositions are set forth in the following table.

*Vulcanization of Chlorobutyl With Dimercaptocyclododecene*

| Compound No | 1 | | | 2 | | | 3 | | | 4 | | | 5 | | | 6 | | |
|---|---|---|---|---|---|---|---|---|---|---|---|---|---|---|---|---|---|---|
| Chlorobutyl (MD-551) | | | | | | | | | | | | | | | | | | |
| Lot 80 [a] | ---- | | | ---- | | | ---- | | | ---- | | | ---- | | | 100 | | |
| Lot 128 [b] | 100 | | | 100 | | | 100 | | | 100 | | | 100 | | | ---- | | |
| SRF black | 50 | | | 50 | | | 50 | | | 50 | | | 50 | | | 50 | | |
| Stearic acid | 1 | | | 1 | | | 1 | | | 1 | | | 1 | | | 1 | | |
| Zinc oxide | 3 | | | 3 | | | 3 | | | 3 | | | 3 | | | 3 | | |
| Dimercaptocyclododecene | ---- | | | 0.96 | | | 1.92 | | | 3.84 | | | ---- | | | ---- | | |
| Tetramethylthiuram disulfide | ---- | | | ---- | | | ---- | | | ---- | | | 1 | | | ---- | | |
| Ethane dithiol | ---- | | | ---- | | | ---- | | | ---- | | | ---- | | | 0.78 | | |
| Mooney scorch at 260° F., time to 5 point rise, minutes | >30 | | | >30 | | | 30 | | | >30 | | | 22 | | | 7 | | |
| Room temperature tensile properties, cure at 307° F., minutes | 15 | 30 | 45 | 15 | 30 | 45 | 15 | 30 | 45 | 15 | 30 | 45 | 15 | 30 | 45 | 15 | 30 | 45 |
| 200% modulus, p.s.i | (1) | 550 | 550 | 770 | 950 | 950 | 750 | 950 | 950 | 220 | 510 | 930 | 700 | 720 | 700 | 680 | 720 | 830 |
| Tensile strength, p.s.i | (1) | 1,850 | 1,830 | 1,950 | 1,490 | 1,700 | 1,800 | 1,510 | 1,450 | 880 | 1,450 | 1,510 | 1,500 | 1,430 | 1,500 | 2,060 | 2,050 | 2,050 |
| Elongation, percent | (1) | 480 | 490 | 460 | 300 | 335 | 430 | 300 | 280 | 780 | 46 | 340 | 400 | 380 | 360 | 440 | 410 | 400 |
| Volume swell in cyclohexane at 25° C., weight increase, percent | ---- | 224 | 206 | 174 | 159 | 158 | 188 | 154 | 154 | 463 | 216 | 164 | 173 | 174 | 171 | 192 | 190 | 196 |
| Ozone resistance, 50% extension, 0.2 volume percent ozone, time to failure, minutes: | | | | | | | | | | | | | | | | | | |
| Crack | ---- | 50 | 50 | 66 | 55 | 80 | 66 | 65 | 80 | (2) | 56 | 150 | 57 | 51 | 57 | 79 | 62 | 50 |
| Break | ---- | 114 | 137 | 200 | 129 | 168 | 213 | 139 | 202 | (2) | 337 | >365 | 150 | 135 | 162 | 208 | 180 | 145 |
| Goodrich flexometer performance, 32 cps., 0.25 in stroke, 100° C. oven temperature, 30 min. test: 45' cure at 307° F.: | | | | | | | | | | | | | | | | | | |
| Load, p.s.i | 89 | | 178 | 89 | | 178 | 89 | | 178 | 89 | | 178 | 89 | | 178 | [c] 118 | | |
| Dynamic drift, percent | 0.0 | | (3) | 0.0 | | 0.0 | 0.0 | | 0.0 | 1.1 | | 19.0 | 0.0 | | 0.0 | 0.0 | | |
| Permanent set, percent | 2.5 | | (3) | 0.6 | | 1.3 | 0.5 | | 1.2 | 7.3 | | 15.1 | 0.9 | | 2.7 | 2.0 | | |
| Temperature rise, °C | 33.5 | | (3) | 24.5 | | 32.0 | 21.5 | | 31.0 | 26.5 | | 37.0 | 22.0 | | 34.0 | 26 | | |
| Appearance | (4) | | ---- | (4) | | (4) | (4) | | (4) | (4) | | (4) | (4) | | (4) | (4) | | |

[a] Lot 80: Chlorine, 1.2%; molecular weight, 416,000; iodine number, 5.9.
[b] Lot 128: Chlorine, 1.4%; molecular weight, 410,000; iodine number, 5.2.
[c] 30' cure, 118 p.s.i. load.

1 No cure.  2 No crack.  3 Failed in 10 minutes.  4 Excellent.

The vulcanization data presented above show that when small amounts of dimercapto cyclododecene are used in conjunction with zinc oxide (recipes 2, 3 and 4) they produce vulcanizates having comparable tensile strengths to similar vulcanizates obtained with either zinc oxide alone (recipe 1) or with zinc oxide and TMTDS (recipe 5). Moreover, the cure rates for the dithiol compounds of chlorinated butyl rubbers were faster than those obtained with the TMTDS and/or zinc oxide recipes. This is reflected in the generally improved moduli of the dithiol vulcanizates in contrast to those of the TMTDS and/or zinc oxide cures. From a comparison of the Mooney scorch time data it can be seen that the present dithiols are superior to the zinc oxide and TMTDS cure, and also to a similar dithiol compound, zinc oxide and ethane dithiol cure. Thus, the Mooney scorch time for the dimercapto cyclododecene vulcanizate was greater than 30 minutes. Further, from a comparison of recipes 2, 3 and 4 it can be seen that in all of these recipes the materials were substantially cured after curing for only 15 minutes while vulcanizates obtained with recipes 1, 5 and 6 were either not fully cured or possessed inferior physical properties. The data on the Goodrich flexometer performance of the recipe materials demonstrate that halogenated butyl rubber with the dimercapto cyclododecene material of this invention and zinc oxide results in vulcanizates having excellent flexing properties even under a severe load (89-178 p.s.i.). The vulcanizates obtained with the present dithiol compound had in general less than ½ the permanent set of the vulcanizates obtained with the TMTDS compound and in addition a smaller rise in temperature. This indicates that the vulcanizates of the present invention would be quite suitable in articles which are continually subject to flexing such as rubber springs. One of the most important property improvements of the present invention is in terms of the vulcanizates' resistance to ozone attack. In this test the vulcanizates were cut in the shape of dumbbells that were 0.75" thick and 0.25" wide at the narrowest part stretched 50% at room temperature for ½ hour and then placed in a closed vessel while stretched and were exposed to air containing 0.2 volume percent ozone. The times required for each sample to crack and break are thus set forth in the table. This data shows that the present dimercapto cyclododecene cured vulcanizates were markedly more resistant to the attack of ozone than any of the other vulcanizates utilizing either TMTDS, zinc oxide alone or ethane dithiol. With respect to the volume swell in cyclohexane wherein each vulcanizate was submerged for 48 hours at 25° C., blotted dry and weighed in a sealed vessel of known weight, the lower volume swell obtained for the dimercapto cyclododecene vulcanizates are in agreement with the high moduli, better ozone resistance and superior dynamic properties found as described above with these vulcanizates.

What is claimed is:

1. The new composition of matter 1-mercapto-5,9-cyclododecadiene.

2. The new composition of matter, x,y-dimercapto-1-cyclododecene wherein x is a number selected from the group consisting of 5 and 6 and y is a number selected from the group consisting of 9 and 10.

3. The process for preparing mercapto derivatives of 1,5,9-cyclododecatriene which comprises reacting cyclododecatriene with thiolacetic acid at temperatures of 20° C. to 100° C. in the presence of a free radical initiator to obtain esters of thiolacetic acid, and hydrolyzing these esters to liberate mercaptans of cyclododecatriene.

4. The process of claim 3 in which the free radical initiator is a peroxide catalyst.

5. The process of claim 3 in which the free radical initiator is ultra violet light.

6. The process of claim 3 in which following hydrolysis the reaction mixture is acidified to neutralize the excess base present and liberate mercaptans.

7. The process of claim 3 in which 1-mercapto-5,9-cyclododecadiene is preferentially prepared by utilizing mol ratios of thiolacetic acid to cyclododecatriene in the range of .01 to 2.

8. The process of claim 3 in which dimercapto derivatives of cyclododecene are preferentially obtained by utilizing mol ratios of thiolacetic acid to cyclododecatriene in the range of 2 to 10.

9. The process of claim 8 in which following esterification, the monoesters of cyclododecatriene are separated from the diesters of cyclododecatriene and in which the monoesters are recycled to the esterification reaction.

References Cited in the file of this patent

UNITED STATES PATENTS

| | | |
|---|---|---|
| 2,460,393 | Paul | Feb. 1, 1949 |
| 2,490,985 | Snyder et al. | Dec. 13, 1949 |
| 2,506,416 | Gilbert et al. | May 2, 1950 |
| 2,700,659 | Carr | Jan. 25, 1955 |